United States Patent [19]

Ladouce et al.

[11] Patent Number: 5,674,579
[45] Date of Patent: Oct. 7, 1997

[54] FLEXIBLE TRANSLUCENT POLYAMIDE COMPOSITION

[75] Inventors: Béatrice Ladouce, Courbevoie; Thibaut Montanari, Bernay; Alain Bouilloux, Bernay; Christelle Guibouin, Bernay; Patrice Perret, Serquigny, all of France

[73] Assignee: Elf Atochem S.A., Puteaux, France

[21] Appl. No.: 560,183

[22] Filed: Nov. 20, 1995

[51] Int. Cl.$^6$ .......................... C08L 23/08; C08L 33/10; C08L 33/12; C08L 77/02

[52] U.S. Cl. .................. 428/35.7; 428/36.9; 428/36.92; 525/179; 525/183; 525/184; 525/185; 525/186; 525/190; 525/227; 525/240; 138/137; 164/176; 524/514

[58] Field of Search ................. 525/179, 183, 525/184, 185, 186, 190, 227, 240; 524/514; 428/35.7, 36.9, 36.92; 138/137; 164/176

[56] References Cited

U.S. PATENT DOCUMENTS 4,554,320  11/1985  Reimann et al. .................. 525/183
5,070,145  12/1991  Guerdoux .......................... 525/179

FOREIGN PATENT DOCUMENTS 0 072 480 A2  2/1983  European Pat. Off. .

Primary Examiner—W. Robinson H. Clark
Attorney, Agent, or Firm—Pennie & Edmonds

[57] ABSTRACT

The invention relates to a translucent and flexible polyamide-based composition, which is easy to process, in particular by extrusion, comprising: (A) from 50 weight-% to 95 weight-% 1) of at least one polyamide resin (I), 2) of various additives (IV) such as stabilizers, mould-release agents, lubricants, crystallization accelerators, pigments, organic and/or inorganic fillers or dyes, or antioxidizing agents, 3) optionally of at least one plasticizing agent (V), and (B) from 5 weight-% to 50 weight-%: (a) of at least one ethylene-alkyl (meth)acrylate-unsaturated dicarboxylic acid anhydride terpolymer (II), (b) of at least one ethylene-alkyl (meth)acrylate copolymer (III) with $\frac{1}{30} \leq (b)/(a) \leq 2$. In accordance with the present invention, the flexural modulus of the composition, measured according to ISO standard 178, is less than or equal to $\frac{2}{3}$ of the flexural modulus of the PA resin (I) alone and is strictly less than 750 MPa. This composition has good extrudability and can be used to make many articles, in particular pipes.

14 Claims, No Drawings

5,674,579

FLEXIBLE TRANSLUCENT POLYAMIDE COMPOSITION

FIELD OF THE INVENTION

The present invention relates to flexible, translucent polyamide-based compositions. Compositions in accordance with this invention have good extrudability and can be used to make articles of manufacture such as pipes.

BACKGROUND OF THE INVENTION

Compositions with a matrix containing polyamide and ethylene-containing polymers are already known for their impact strength.

In particular, EP 096,264 describes a material with a high impact strength containing:

(A) a thermoplastic polyamide having a relative viscosity of 2.5 to 5, and (B) from 5 to 60 weight-%, with respect to (A), of an uncrosslinked terpolymer consisting of:
  (a) 55 to 79.5 weight-% of ethylene,
  (b) 20 to 40 weight-% of at least one primary or secondary alkyl (meth)acrylate, and
  (c) 0.5 to 8 weight-% of a functionally acidic monomer (for example, maleic anhydride).

EP 218,665 describes compositions containing from 50 to 95 weight-% of at least one polyamide resin and from 5 to 50 weight-% of at least one ethylene polymer containing from 0.9 to 16 mol-% of units derived from maleic anhydride and/or from at least one alkyl acrylate or methacrylate in which the alkyl group has from 1 to 6 carbon atoms. The said ethylene polymer is present in the form of a mixture of ethylene-alkyl (meth)acrylate copolymer (A) and of ethylene-maleic anhydride-alkyl (meth)acrylate terpolymer (B), the (A)/(B) ratio by weight being between $1/3$ and 3.

EP-A-072,480, which describes an impact-resistant composition comprising from 50 to 90 weight-% of polyamide, from 1 to 45 weight-% of an ionomeric ethylene resin and from 0.5 to 40 weight-% of an elastomeric ethylene copolymer, is also known.

Finally, U.S. Pat. No. 3,373,223 describes a polymer alloy essentially composed of 25 to 90 weight-% of polyolefin, 5 to 70 weight-% of polyamide and 1 to 10 weight-% of an ethylene-(meth)acrylic acid copolymer.

However, these compositions, which have an improved impact strength in comparison with the polyamide matrix employed alone, require high processing temperatures—often greater than 270° C. Moreover, they are not generally simultaneously translucent and flexible.

SUMMARY OF THE INVENTION

A translucent composition based on polyamide resin, which is very flexible and easy to process, in particular by extrusion, has now been found.

The present invention provides a translucent, flexible composition that comprises:

(A) from 50 weight-% to 95 weight-% of at least one polyamide resin (I), the light transmission of which through a sheet with a thickness of 1 mm at 700 nanometers is greater than 15%, (B) from 5 weight-% to 50 weight-% of: (a) at least one ethylene/alkyl (meth)acrylate/unsaturated dicarboxylic acid anhydride terpolymer (II), and (b) at least one ethylene/alkyl (meth)acrylate copolymer (III), wherein the weight ratio (b):(a) is at least about $1/30$ but no more than about 2/1. In accordance with the present invention, the flexural modulus of the composition, measured according to ISO standard 178, is less than or equal to $2/3$ of the flexural modulus of the PA resin (I) alone and is less than 750 MPa.

In the composition of the present invention, component (A) may further comprises one or more additives selected from the group consisting of stabilizers, mould-release agents, lubricants, crystallization accelerators, pigments, organic and inorganic fillers and dyes, and antioxidizing agents. Component (A) may also further comprise up to 50 weight-% of one or more plasticizing agents.

The present invention also provides a process for the manufacture of a pipe which comprises the steps of: melting a composition as described above to form a molten mass, extruding said molten mass through a circular die to provide a tubular article, and cutting said tubular article transversely to form a length of pipe.

The present invention likewise contemplates translucent, flexible pipes and other articles that comprise a composition as described above.

DESCRIPTION OF THE PREFERRED EMBODIMENTS

The composition of the present invention is characterized in that it comprises:

(A) from 50 weight-% to 95 weight-%
  1) of at least one polyamide resin (I), the light transmission of which at 700 nanometers is greater than 15% and preferably greater than 30% (through a sheet with a thickness of 1 mm),
  2) of various additives (IV) such as stabilizers, mould-release agents, lubricants, crystallization accelerators, pigments, organic and/or inorganic fillers or dyes, or antioxidizing agents,
  3) optionally of at least one plasticizing agent (V) representing from 0 to 50 weight-% of (A) and preferably less than 20 weight-% of (A), (B) from 5 weight-% to 50 weight-% and preferably from 10 to 40 weight-%:
  (a) of at least one ethylene-alkyl (meth)acrylate-unsaturated dicarboxylic acid anhydride terpolymer (II),
  (b) of at least one ethylene-alkyl (meth)acrylate copolymer (III)
  with $1/30 \leq (b)/(a) \leq 2$ and preferably $(b)/(a) \leq 2/3$ and such that its flexural modulus, measured according to ISO standard 178, is less than or equal to $2/3$ of the flexural modulus of the PA resin (I) alone and is strictly less than 750 MPa, and advantageously less than or equal to $1/3$ of the flexural modulus of the PA resin (I) alone and is strictly less than 500 MPa.

According to the present invention, the terpolymer (II) comprises from 77 mol-% to 99.2 mol-% of at least one unit derived from ethylene, from 0 mol-% to 20 mol-% of at least one unit derived from alkyl (meth)—acrylate(s) and from 0.8 mol-% to 3 mol-% of at least one unit derived from unsaturated dicarboxylic acid anhydride(s), and preferably of at least one maleic anhydride derivative, and has a melt index of between 0.1 and 400 g/10 min, measured according to NFT standard 51016 (190° C./load of 2.16 kg). For reasons of simplification, the term "terpolymer" is employed throughout the text, even in the cases where (II) does not contain any unit derived from alkyl (meth)acrylate(s).

According to the present invention, the copolymer (III) comprises at least 78 mol-% of units derived from ethylene and up to 22 mol-% of at least one unit derived from alkyl (meth)acrylate(s) and has a melt index of between 0.1 and 400 g/10 min, measured according to NFT standard 51–016 (190° C./load of 2.16 kg).

The alkyl groups of the alkyl acrylate or methacrylate taking part in the terpolymers (II) and/or in the copolymers (III) may be linear, branched or cyclic and aliphatic, cycloaliphatic and/or aromatic and may contain up to 10 carbon atoms.

Mention may be made, as illustrations of alkyl from acrylate or methacrylate from which the terpolymers (II) and/or the copolymers (III) derive, of, in particular, methyl acrylate, ethyl acrylate, n-butyl acrylate, isobutyl acrylate, 2-ethylhexyl acrylate, cyclohexyl acrylate, methyl methacrylate and ethyl methacrylate. Among these alkyl acrylate and methacrylates, ethyl acrylate (EA), n-butyl acrylate (BA) and methyl acrylate (MA) are very particularly preferred.

Mention may be made, as illustrations of unsaturated dicarboxylic acid anhydride from which the terpolymers (II) derive, of itraconic anhydride, citraconic anhydride, 2-methylmaleic anhydride, 2,3-dimethylmaleic anhydride, bicyclo[2.2.2]oct-5-ene-2,3-dicarboxylic anhydride and, preferably, maleic anhydride.

polyamide resin according to the invention is understood to mean the polyamides or PAs which contain aliphatic units containing at least 7 carbon atoms and/or cycloaliphatic units and/or aromatic units.

Mention may be made of the resins obtained by polycondensation of one or a number of lactams or of $\alpha$, $\omega$-amino acids or by a substantially stoichiometric polycondensation of one or a number of aliphatic diamine(s) and of one or a number of aliphatic dicarboxylic acid(s). it is possible to use an excess of diamine, so as to obtain an excess of amine end groups with respect to the carboxyl end groups in the polyamide.

The lactams contain at least 7 carbon atoms and preferably at least 10. The preferred lactams are decalactam, undecalactam and dodecalactam.

The preferred $\alpha$, $\omega$-amino acids are 10-aminodecanoic, 11-aminoundecanoic and 12-aminododecanoic acids.

The aliphatic diamines are $\alpha$, $\omega$-diamines containing, between the end amino groups, at least 6 carbon atoms and preferably from 6 to 10. The carbon chain may be linear (polymethylenediamine) or branched. Preferred diamines are hexamethylenediamine (HMDA) and dodecamethylenediamine.

The aliphatic dicarboxylic acids are $\alpha$, $\omega$-dicarboxylic acids having at least 5 carbon atoms (not including the carbon atoms of the carboxyl groups), and preferably at least 6, in the linear or branched carbon chain. The preferred diacids are azelaic, sebacic and 1, 12-dodecanoic acids.

Mention may be made, as illustrations of such PA resins, of: polyhexamethylene sebacamide (PA-6,10), polyhexamethylene dodecanediamide (PA-6,12), poly(undecanoamide) (PA-11), polylauryllactam (PA-12), and polydodecamethylene dodecanediamide (PA-12,12).

The PAs have a number-average molecular mass $\overline{Mn}$ generally greater than or equal to 5,000. Their inherent viscosity (measured at 20° C. for a 0.5 g sample in 100 g of meta-cresol) is generally greater than 0.7.

PA, within the meaning of the present invention, is also understood to mean mixtures of polymers containing at least 50 weight-% of the polyamides described above where the matrix phase consists of polyamide.

Mention may be made, as examples of mixtures, of mixtures of aliphatic polyamides and of semi-aromatic and/or amorphous polyamides, such as those described in EP 550,308, as well as PA/polyolefin mixtures and in particular those described in EP 342,066.

PA according to the invention is also understood to mean polyamide-based thermoplastic elastomers (TPE) which are block copolymers, also known as polyetheramides, the rigid sequences of which consist of polyamide and the crystallizable flexible sequences of which consist of polyether.

Mention may be made, among the plasticizing agents (V) which may be incorporated in the compositions according to the invention, of, for example, butylbenzenesulphonamide (BBSA), ethylhexyl para-hydroxybenzoate (EHPB) or decahexyl para-hydroxybenzoate (DHPB).

In general, plasticizing agents have the disadvantage of exuding more or less rapidly (a few days to a few months) out of the polymeric material in which they are incorporated, thus resulting in a loss in mass and dimensional variation in material.

The compositions according to the invention which are plasticized, i.e. in which (V) >0, have the additional advantage, compared with polyamide-based compositions containing only plasticizer (V) but containing neither terpolymer (II) nor copolymer (III), of having a similar flexibility for a lower level of plasticizer and thus for reduced exudation and better dimensional stability.

The above compositions can be obtained in a known way by any technique for mixing the constituents in the molten state, such as, for example, extrusion or compounding using a single- or twin-screw extruder or a co-kneader, or by any continuous or batch technique, such as, for example, using an internal mixer.

The present invention also relates to the processes for the conversion of the said compositions and to the articles obtained. The materials or articles obtained, in particular pipes, films, tubing, sheets, fibers, and the like, are translucent and have good mechanical and chemical properties, such as good flexibility.

Among all the conventional conversion methods used in the thermoplastics industry which are suitable for the production of articles based on compositions according to the invention, mention will very particularly be made of extrusion techniques.

The materials obtained by extrusion from the compositions according to the invention, for example pipes, have a smooth surface condition; their transparency is therefore not disturbed by surface defects.

The extrudability of the compositions according to the invention during their conversion is significantly better than the extrudability of PA-based compositions which did not simultaneously contain terpolymer(s) (II) and copolymer(s) (III); in practice, this better extrudability may be reflected in reduced extrusion temperatures (of the order of approximately thirty degrees Celsius) with a similar behavior of the molten product and with a similar final appearance of the pipe.

In the case of compositions based on plasticized PA, (V) >0, the expression "better extrudability" is reflected in extrusion temperatures similar to those of the plasticized PA containing neither terpolymer(s) (II) nor copolymer(s) (III).

EXAMPLES

The following non-limiting Examples illustrate the invention.

Example 1

The extrusion is carried out, in a twin-screw extruder or in a co-kneader, in the form of rods which are then granulated, of a mixture comprising

* 70 weight-% of PA-11 plasticized to 12 weight-% with BBSA, the inherent viscosity of which is between 1 and 1.2 and the melting temperature of which is between 176 and 183° C.
* 25 weight-% of ethylene-BA-maleic anhydride terpolymer with the molar composition 94.4/4.6/1 and with a melt index equal to 4.5 g/10 min, measured according to NFT standard 51-016 (190"C./load of 2.16 kg),

* 5 weight-% of copolymer of ethylene and of MA with the molar composition 94.4/5.6 and with a melt index equal to 0.3 9/10 min, measured according to NFT standard 51-016 (190° C./load of 2.16 kg).

The flexural modulus, the exudation and the translucency of the composition thus obtained are measured.

The flexural modulus is measured according to ISO standard 178; the flexural modulus of the corresponding PA alone is also given, by way of comparison.

The exudation is determined by the loss in weight undergone by a sample after 30 days in an air-ventilated oven at 120° C.

The translucency is determined by the light transmission at 700 nm through a sheet with a thickness of 1 mm. A light transmission greater than 15% is judged acceptable and particularly advantageous when it is greater than 30%.

This composition is then extruded in the form of a pipe with an internal diameter equal to 6 mm and with an external diameter equal to 8 mm using an extruder equipped a) with a screw adapted to the extrusion of plasticized PA with a diameter of 60 mm and with a length/diameter ratio of 24 b) and with a die coated with chromium or nickel. The extrudability is determined by assessing the ease of processing during the extrusion of the pipe (behavior of the molten mass, sizing of the diameter of the pipe, nonbreaking) and by measuring the maximum temperature of the curve of the extrusion temperatures necessary to obtain a pipe with a good appearance (smooth surface appearance). The extrudability is described as "poor" when the pipe has a poor surface appearance and/or the conversion process is poorly controlled and/or the temperature curve necessary to obtain a pipe with a good appearance is too high.

The results are combined in Table 1.

EXAMPLES 2.a to 2.c (comparative)

By way of comparison, pipes with identical dimensions to that described in Example 1 are extruded from PA-11
  a) containing a different level of plasticizer (2835 weight-%), the inherent viscosity of which is between 1.1 and 1.4 and the melting temperature of which is between 170 and 176° C. (Example 2.a)
  b) containing the same level of plasticizer as that described in Example 1 but the inherent viscosity of which is between 1.4 and 1.6 (Example 2.b).
  c) not containing plasticizer and the inherent viscosity of which is between 1.3 and 1.6 and the melting temperature of which is between 183° and 187° C. (Example 2.c).

The flexural modulus, exudation and translucency of the PA-11 samples thus extruded and the extrudability of the pipes obtained are measured. The results are combined in Table 1.

EXAMPLES 2.d to 2.f (comparative)

By way of comparison, the following mixtures are extruded and then shaped as pipes with the same dimensions as that described in Example 1:
  d) a mixture (Example 2.d) comprising
    * 70 weight-% of the same PA-11 as that in Example 1 (plasticized to 12 weight-% with BBSA)
    * 30 weight-% of ethylene-BA-maleic anhydride terpolymer with the molar composition 94.4/4.6/1 and with a melt index equal to 4.5 g/10 min, measured according to NFT standard 51-016 (190° C./load of 2.16
  e) a mixture (Example 2.e) comprising
    * 70 weight-% of the same PA-11 as that in Example 1 (plasticized to 12 weight-% with BBSA)
    * 30 weight-% of ethylene-BA-maleic anhydride terpolymer with the molar composition 88.2/11.5/0.3 and a melt index equal to 7 g/10 min, measured according to NFT standard 51-016 (190° C./load of 2.16 kg),
  f) a mixture (Example 2.f) comprising
    * 70 weight-% of the same PA-11 as that in Example 1 (plasticized to 12 weight-% with BBSA)
    * 30 weight % of ethylene-maleic anhydride copolymer with the molar composition 94.4/5.6.

The flexural modulus, exudation and translucency of the samples based on PA-11 thus extruded and the extrudability of the pipes obtained are measured. The results are combined in Table 1.

EXAMPLE 3

A mixture comprising
  * 70 weight-% of PA-12 plasticized to 12 weight-% with BBSA and the inherent viscosity of which is between 1.3 and 1.7 and the melting temperature of which is between 168° and 174° C.
  * 25 weight-% of ethylene-BA-maleic anhydride terpolymer with the molar composition 94.4/4.6/1 and with a melt index equal to 4.5 g/10 min, measured according to NFT standard 51-016 (190° C./load of 2.16 kg),
  * 5 weight-% of copolymer of ethylene and of MA with the molar composition 94.4/5.6 is extruded and then shaped as a pipe with the same dimensions as that described in Example 1.

The flexural modulus, exudation and translucency of the sample based on PA-12 thus extruded and the extrudability of the pipe obtained are measured. The results are combined in Table 1.

EXAMPLE 4 (comparative)

By way of comparison, a mixture comprising
  * 75 weight-% of PA-12 with the same characteristics as that in Example 3 (containing the same level of BBSA)
  * 25 weight-% of ethylene-propylene-maleic anhydride elastomeric copolymer mEPR comprising from 0.4 to 0.8 mass % of maleic anhydride is extruded and then shaped as a pipe with the same dimensions as that described in Example 1.

The flexural modulus, exudation and translucency of the sample based on PA-12 thus extruded and the extrudability of the pipe obtained are measured. The results are combined in Table 1.

EXAMPLE 5 (comparative)

By way of comparison, a mixture comprising
  * 70 weight-% of non-plasticized PA-6, the melting temperature of which is between 217° and 223° C.
  * 25 weight-% of ethylene-BA-maleic anhydride terpolymer with the molar composition 94-4/4.6/1 and with a melt index equal to 4.5 g/10 min, measured according to NFT standard 51-016 (190° C./load of 2.16 kg),
  * 5 weight-% of copolymer of ethylene and of MA with the molar composition 94.4/5.6 is extruded and then shaped as a pipe with the same dimensions as that described in Example 1.

The flexural modulus, exudation and translucency of the sample based on PA-6 thus extruded and the extrudability of the pipe obtained are measured. The results are combined in Table 1.

TABLE 1

| Example | Flexural modulus of the PA alone (MPa) | Flexural modulus of the composition (MPa) | Exudation (%) | Translucency (%) | Extrudability for an extruder output of 20 m/min | Extrudability Maximum temperature of the optimum extrusion curve (°C.) |
|---|---|---|---|---|---|---|
| 1 | 1,100 | 150–200 | 8–9 | >30 | very good | ≦240 |
| 2.a | 1,100 | 150 | 28–30 | >30 | very good | 220–230 |
| 2.b | 1,100 | 300–350 | 11–12 | >30 | very good | ≦240 |
| 2.c | 1,100 | 1,100 | 0 | >30 | very good | ≦240 |
| 2.d | 1,100 | 150–200 | 8–9 | >30 | poor | ≧260 |
| 2.e | 1,100 | 150–200 | 8–9 | >15 | poor | ≧260 |
| 2.f | 1,100 | 150–200 | 8–9 | >15 | poor | * |
| 3 | 1,200 | 150–200 | 8–9 | >30 | very good | ≦240 |
| 4 | 1,200 | 200 | 8–9 | >15 | good | ≧250 |
| 5 | 2,200 | 1,000–1,200 | 0 | <15 | | |

*: swelling of the pipe; uncontrollable process

What is claimed is:

1. A translucent, flexible composition comprising:
  (A) from 50 weight-% to 95 weight-% of at least one polyamide resin (I), the light transmission of which through a sheet with a thickness of 1 mm at 700 nanometers is greater than 15%,
  (B) from 5 weight-% to 50 weight-% of:
    (a) at least one ethylene/alkyl (meth)acrylate/ unsaturated dicarboxylic acid anhydride terpolymer (II), and
    (b) at least one ethylene/alkyl (meth)acrylate copolymer (III)
    wherein $1/30 \leq (b)/(a) \leq 2$, and wherein the flexural modulus of said composition, measured according to ISO standard 178, is less than or equal to $2/3$ of the flexural modulus of the PA resin (I) alone and is less than 750 MPa.

2. Composition according to claim 1, wherein said light transmission of said at least one polyamide resin (I) is greater than 30%, and wherein said flexural modulus of said composition is less than or equal to $1/3$ of the flexural modulus of the PA resin (I) alone and is less than 500 MPa.

3. Composition according to claim 1, which comprises from 60 weight-% to 90 weight-% of component (A) and from 10 weight-% to 40 weight-% of component (B) and wherein $1/30 \leq (b)/(a) \leq 2/3$.

4. Composition according to claim 1, wherein component (A) further comprises one or more additives selected from the group consisting of stabilizers, mould-release agents, lubricants, crystallization accelerators, pigments, organic and inorganic fillers and dyes, and antioxidizing agents.

5. Composition according to claim 1, wherein component (A) further comprises up to 50 weight-% of one or more plasticizing agents.

6. Composition according to claim 1, wherein said plasticizing agents comprise up to 20 weight-% of component (A).

7. Composition according to claim 1, wherein said polyamide is selected from the group consisting of PA-11, PA-12, PA-12,12, and mixtures thereof.

8. Composition according to claim 1, wherein the alkyl (meth)acrylate units that comprise the terpolymer (II) and/or the copolymer (III) are selected from the group consisting of methyl, ethyl, n-butyl, isobutyl, 2-ethylhexyl, and cyclohexyl acrylates and methyl and ethyl methacrylates.

9. Composition according to claim 8, wherein said alkyl (meth)acrylate units are selected from the group consisting of ethyl acrylate, n-butyl acrylate, and methyl acrylate.

10. Composition according to claim 1, wherein the unsaturated dicarboxylic acid anhydride that comprises the terpolymer (II) is maleic anhydride.

11. A process for the manufacture of a pipe which comprises the steps of:
  melting a composition of claim 1 to form a molten mass,
  extruding said molten mass through a circular die to provide a tubular article, and
  cutting said tubular article transversely to form a length of pipe.

12. The method of claim 11, wherein said extrusion consists of single-layer extrusion.

13. A flexible, translucent article of manufacture comprising a pipe, a film, tubing, a sheet, or a fiber, wherein said article comprises a composition as defined in claim 1.

14. The article of manufacture of claim 13, configured as a tubular pipe.

* * * * *